S. P. Taylor,
Horse Collar,
No. 80,682.    Patented Aug. 4, 1868.
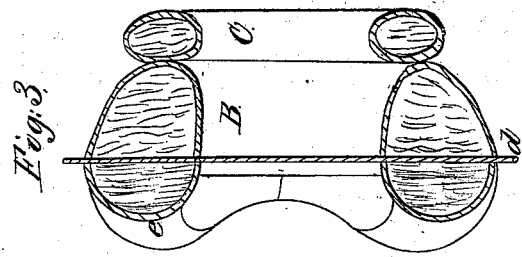
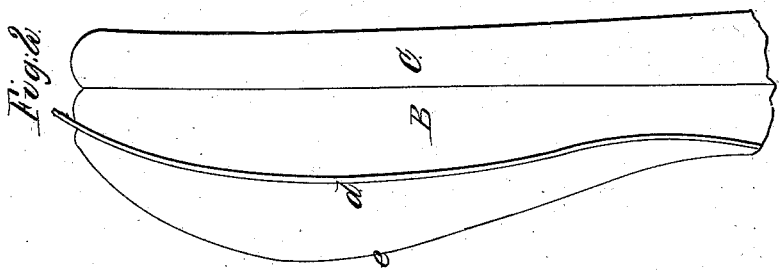
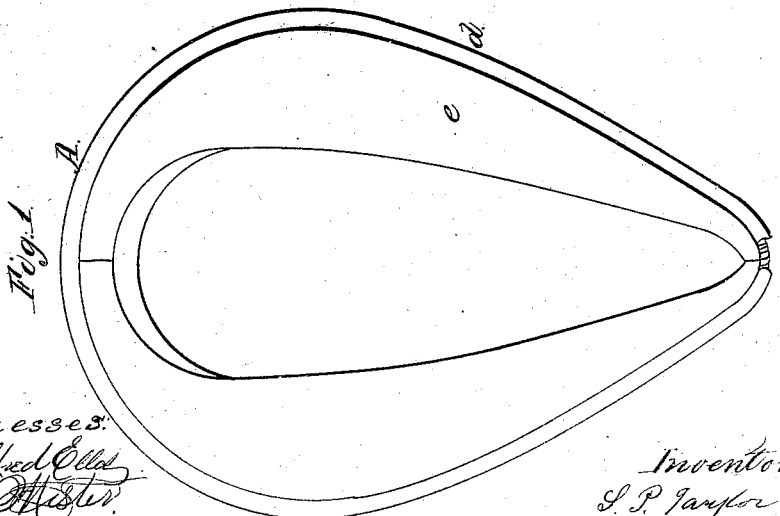
Witnesses:
Inventor:
S. P. Taylor

United States Patent Office.

SPENCER P. TAYLOR, OF OXFORD, OHIO.

Letters Patent No. 80,682, dated August 4, 1868.

IMPROVEMENT IN HORSE-COLLARS.

*The Schedule referred to in these Letters Patent and making part of the same.*

TO ALL WHOM IT MAY CONCERN:

Be it known that I, SPENCER P. TAYLOR, of Oxford, in the county of Butler, and State of Ohio, have invented certain new and useful Improvements in Horse-Collars; and I do hereby declare that the following is a full, clear, and exact description thereof, reference being had to the accompanying drawings, and to the letters of reference marked thereon, which form a part of this specification, in which—

Figure 1 represents a plan view of my collar,

Figure 2 is a side view of the same, and

Figure 3 a transverse section, taken through the middle of the collar.

The nature of my invention consists in constructing a horse-collar with a partition in it, formed in the manner and for the purpose hereinafter set forth.

To enable others skilled in the art to make and use my invention, I will now describe its construction.

A represents the collar, constructed with two sections, B and C, having the usual cavity between them to receive the hames.

Section B is furnished with the leather partition $d$, the said partition dividing the section B longitudinally into two compartments, the inner compartment or section marked $e$ being intended to rest against the horse's shoulder.

The section $e$ will be stuffed with hair or wool, in the usual manner, and the sections B C will be stuffed with straw prepared for that purpose.

The advantage of my improvement consists in forming, by the use of partition $e$, a distinct compartment for the reception of hair or wool, and leaving the remaining two sections to be filled with cheaper material. By this arrangement the softest material is used in that part of the collar which comes in contact with the horse's shoulder, and the cheap material placed where it can do no injury, but will at the same time diminish the cost of my collar.

I do not claim the use of two different materials for the stuffing of a horse-collar, such an arrangement having been heretofore patented, but being provided with no means of preventing the material from becoming mingled or displaced; but

What I claim, and desire to secure by Letters Patent, is—

A horse-collar, divided by a partition, $e$, into compartments for the reception of different materials, substantially as described.

In testimony that I claim the foregoing as my own, I affix my signature in presence of two witnesses.

SPENCER P. TAYLOR.

Witnesses:
 MAYHEW DUNHAM,
 W. H. SMITH.